United States Patent Office 3,325,508
Patented June 13, 1967

3,325,508
2-TRICHLOROMETHYL BENZIMIDAZOLES
Eva Lea Samuel, East Bentleigh, Victoria, and George Holan, Brighton, Victoria, Australia, assignors to Monsanto Chemicals (Australia) Limited, West Tootscray, Victoria, Australia, a company of Australia
No Drawing. Filed Dec. 21, 1964, Ser. No. 420,198
Claims priority, application Australia, Dec. 23, 1963, 39,149/63
11 Claims. (Cl. 260—309.2)

This invention relates to new 2-substituted benzimidazoles which are of use per se as biological toxicants, such as anthelmintics, and are also useful as intermediates for the preparation of various valuable compounds including other 2-substituted benzimidazoles which have desirable biological toxicant properties.

The new compounds of the present invention are 2-trichloromethyl benzimidazoles having the structural formula:

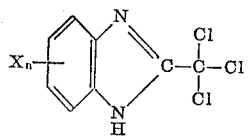

wherein X is a substituent selected from the halogens, hydroxy, acyloxy, alkyl, alkoxy, alkylthio, haloalkyl, nitro, amino and substituted amino groups including, for example, acylamino, alkylamino and dialkylamino, and $n$ is an integer from 0 to 4 inclusive. The halogen substituent, or the halo portion of the haloalkyl substituent, is preferably chlorine, but can be bromine, fluorine or iodine. The alkyl group, or the alkyl portion of the alkoxy, acyloxy, alkylthio, haloalkyl, alkylamino, dialkylamino and acylamino groups, can contain a maximum of 8 carbon atoms, and preferably have from 1 to 4 carbon atoms. The substituents can be located in any position; but, when $n$ is 2, it is preferred that the substituents be in the 5 and 6 positions or in the 4 and 7 positions. However, they can also be located in the 4 and 5 positions. Preferred benzimidazoles of the present invention therefore include those having the following formulae

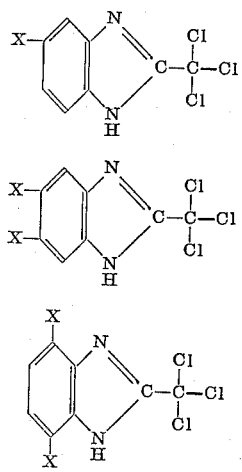

In these formulae, X is as defined above.

Compounds in accordance with the present invention, excluding those having a nitro group, which is a powerful electron-withdrawing group, may be prepared by a method which comprises reacting a mono-salt of an appropriately substituted o-phenylene diamine with an alkyl trichloroacetimidate, as illustrated in the following equation:

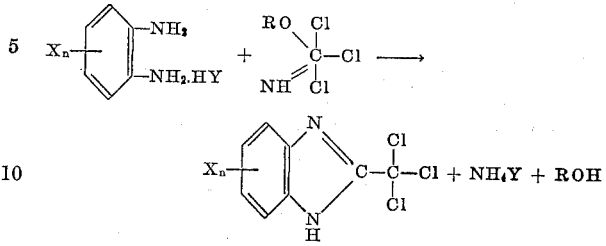

wherein $n$ is 0 to 4, and X is as defined above but excluding the nitro group; wherein Y denotes the negative radical of a mineral acid, preferably hydrochloric or sulphuric acid; and wherein R denotes an alkyl group having a maximum of 4 carbon atoms.

Reaction of the phenylene diamine salt and the alkyl trichloroacetimidate can be effected by mixing the two reagents together in the presence of an inert solvent or diluent. Suitable solvents include ethers, such as dioxan, diethyl ether, 1,2-dimethoxyethane; esters, for example, ethyl acetate; and alcohols such as methanol or ethanol and the like. The sequence of mixing the reactants is not critical, but it is more convenient to add the alkyl trichloroacetimidate gradually to a solution or suspension of the phenylene diamine salt. The temperature and duration of the reaction varies appreciably with the nature of the nuclear substituents denoted by X. Electron-donating groups such as alkyl and alkoxy favour the reaction, which then occurs readily at room temperature, in some cases cooling being desired as the reaction is exothermic. On the other hand, electron-attracting groups such as halogen retard the reaction and a temperature of 40–50° C. is preferred for the reaction to be substantially complete within a reasonable time. The reaction product is isolated and purified by conventional procedures.

The substituted 2-trichloromethylbenzimidazoles of the present invention wherein X is the very powerful electron-withdrawing nitro group can be prepared by reacting a mono-salt of o-phenylenediamine with an alkyl trichloroacetimidate to form 2-trichloromethylbenzimidazole, as indicated, then nitrating said 2-trichloromethylbenzimidazole. Alternatively, the nitro-substituted 2-trichloromethylbenzimidazoles of the present invention can be prepared by chlorination of 2-methylbenzimidazoles, as illustrated in the following equation:

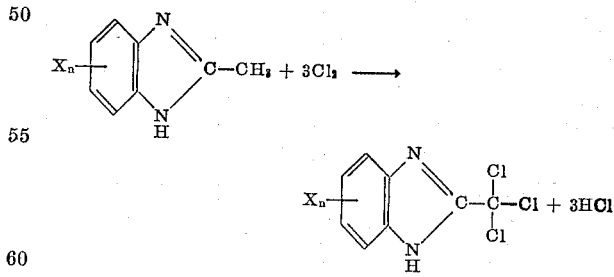

wherein X is nitro, the methyl group of the 2-methylbenzimidazole starting material being converted into the trichloromethyl group by chlorination, which preferably is conducted in the presence of ultraviolet light. This method can also be utilized for the preparation of 2-trichloromethylbenzimidazoles in which the benzene nucleus is unsubstituted or has a halogen substituent or substituents.

Illustrative of the compounds embraced by the structural formula specified above are:

2-trichloromethylbenzimidazole
2-trichloromethyl-5-methylbenzimidazole
2-trichloromethyl-5,6-dimethylbenzimidazole
2-trichloromethyl-5-methoxybenzimidazole
2-trichloromethyl-5-chlorobenzimidazole
2-trichloromethyl-5-bromobenzimidazole
2-trichloromethyl-5,6-dichlorobenzimidazole
2-trichloromethyl-5-methylthiobenzimidazole
2-trichloromethyl-5-chloromethylbenzimidazole
2-trichloromethyl-5-nitrobenzimidazole
2-trichloromethyl-5-aminobenzimidazole
2-trichloromethyl-5-acetylaminobenzimidazole
2-trichloromethyl-5-methylaminobenzimidazole
2-trichloromethyl-5-dimethylaminobenzimidazole
2-trichloromethyl-4-fluorobenzimidazole
2-trichloromethyl-4,7-difluorobenzimidazole
2-trichloromethyl-4-iodobenzimidazole
2-trichloromethyl-4-hydroxybenzimidazole
2-trichloromethyl-5,6-dihydroxybenzimidazole
2-trichloromethyl-5-acetoxybenzimidazole
2-trichloromethyl-4,7-dioctylbenzimidazole
2-trichloromethyl-5-heptylbenzimidazole
2-trichloromethyl-4,7-dioctylthiobenzimidazole
2-trichloromethyl-5-iodobutylbenzimidazole
2-trichloromethyl-5-fluoroethylbenzimidazole
2-trichloromethyl-4-bromohexylbenzimidazole
2-trichloromethyl-4,7-di(acetylamino)-benzimidazole
2-trichloromethyl-5-dibutylaminobenzimidazole
2-trichloromethyl-5,6-di(dibutylamino)-benzimidazole
2-trichloromethyl-4,7-di(octylamino)-benzimidazole
2-trichloromethyl-4,5,6,7-tetrahydroxybenzimidazole
2-trichloromethyl-4,5,6,7-tetramethylbenzimidazole
2-trichloromethyl-4,5,6,7-tetrachlorobenzimidazole Preparation of the new compounds of this invention, utilizing the preferred methods described above, is illustrated in the following non-limitative examples:

Example 1

2-trichloromethylbenzimidazole was prepared as follows: Methyl trichloroacetimidate (0.1 mole) was added to a solution of o-phenylene diamine hydrochloride (0.1 mole) in dry methanol (150 ml.). An exothermic reaction occurred and a solid began to precipitate in about half an hour. The reaction was substantially completed in about 2 hours and the reaction mixture was then poured into water to give 2-trichloromethylbenzimidazole in 85% yield. The white crystalline product was recrystallized from glacial acetic acid. The recrystallized material had a melting point over 360° C. and was identified by infra red (C–Cl peak at 820 cm.$^{-1}$ and ultra violet spectra max. at 284 and 224 m$\mu$.) with the following microanalytical figures:

Analysis for $C_8H_5Cl_3N_2$. Found: C, 40.5; H, 2.4; N, 12.2; Cl, 45.5%. Calculated: C, 40.8; H, 2.1; N, 11.8; Cl, 45.2%.

The methyl trichloroacetimidate starting material can be prepared from trichloroacetonitrile and methanol in the presence of anhydrous potassium carbonate by the method of Cramer, Ber., 1958, 91, 1049.

Example 2

2-trichloromethyl-5-chlorobenzimidazole was prepared as follows:

Methyl trichloroacetimidate (0.02 mole) was added to a solution of 4-chloro-o-phenylenediamine monohydrochloride (0.02 mole) and the reaction mixture maintained in dry methanol at room temperature for 8–10 hours. This mixture on quenching with water gave crude 2-trichloromethyl-5-chlorobenzimidazole in 55% yield with 5% contaminate. The latter was removed by dissolving the mixture in acetic acid, filtration of the insoluble contaminate and aqueous quenching. Several recrystallizations of the product from xylene gave an analytically pure white crystalline material, M.P. 235° C. (I.R. spectrum aliphatic C–Cl 820 cm.$^{-1}$ aromatic C–Cl 810 cm.$^{-1}$).

Analysis for $C_8H_4Cl_4N_2$. Found: C, 36.1; H, 1.8; N, 10.4; Cl, 52.3%. Calculated: C, 35.7; H, 1.5; N, 10.4; Cl, 52.4%.

The 4-chloro-o-phenylene diamine monohydrochloride starting material can be prepared from the purified base by addition of hydrochloric acid in methanol and precipitation of the salt with petroleum ether.

Example 3

2-trichloromethyl-5,6-dichlorobenzimidazole was prepared as follows:

4,5-dichloro-o-phenylene diamine monohydrochloride (0.01 mole) was mixed with methyl trichloroacetimidate (0.01 mole) in dry methanol (20 ml.), and a slightly exothermic reaction occurred. After standing overnight, precipitation took place on agitation of the mixture. The product was separated by filtration, washed to remove $NH_4Cl$ and recrystallized from methanol to give 2-trichloromethyl - 5,6 - dichlorobenzimidazole, as off-white prisms with M.P. 252° C. (I.R. spectrum aliphatic C–Cl 830 cm.$^{-1}$, aromatic C–Cl 900 cm.$^{-1}$).

Analysis for $C_8H_3N_2Cl_5$. Found: C, 32.0; H, 1.2; N, 9.0; Cl, 56.5%. Calculated: C, 32.5; H, 1.2; N, 9.5; Cl, 56.0%.

The 4,5-dichloro-o-phenylene diamine monohydrochloride starting material can be prepared from the corresponding base by addition of hydrochloric acid in methanol and evaporation of the solvent.

Example 4

2-trichloromethyl-5,6-dimethylbenzimidazole was prepared as follows:

Methyltrichloroacetimidate (0.01 mole) was added to a suspension of 4,5-dimethyl-o-phenylene diamine monohydrochloride (0.01 mole) in dimethoxyethane (80 ml.). No apparent reaction took place, and the mixture was allowed to stand at room temperature for 6 days. At the end of this period, filtration of the insoluble materials showed it to contain about 50% of the starting hydrochloride. Addition of petroleum ether (40–60° C.) to the filtrate precipitated an oily material, which was filtered off and the filtrate was evaporated to give crude 2-trichloromethyl-5,6-dimethylbenzimidazole in 35% yield. The crude material was recrystallized three times from benzene to give a white crystalline material having M.P. 190° C. After 4 hours drying at 80° C. under vacuum, analysis showed the material to contain ⅓ molecule of benzene of crystallization.

Analysis for $C_{10}H_9N_2Cl_3 \cdot ⅓ C_6H_6$. Found: C, 50.5; H, 3.8; N, 9.5; Cl, 36.9%. Calculated: C, 49.8; H, 3.8; N, 9.6; Cl, 36.8%.

After further two recrystallizations from benzene, the material with M.P. 190° C. was dried for four hours at 100° C. under vacuum. Analysis showed that it now contained ⅙ molecule of benzene of crystallization.

Analysis for $C_{10}H_9N_2Cl_3 \cdot ⅙ C_6H_6$. Found: C, 47.6; H, 3.7; N, 10.1; Cl, 38.7%. Calculated: C, 47.7; H, 3.7; N, 10.1; Cl, 38.5%.

The molecular weight (Mechrolab osmometer) was found to be 254 if allowance is made for the solvent, or 233 if the solvent is neglected, actual molecular weight of the non-volatile portion is 263. When the crude material was recrystallized, three times from chloroform, the white solid with M.P. 190° C., after drying at 80° C. under vacuum for four hours was shown to contain a ⅓ molecule of chloroform of crystallization.

Analysis for $C_{10}H_9N_2Cl_3 \cdot ⅓ CHCl_3$. Found: C, 41.0; H, 3.2; N, 9.0; Cl, 46.7%. Calculated: C, 41.0; H, 3.1; N, 9.2; Cl, 46.7%.

The molecular weight (Mechrolab osmometer) was found to be 254 if allowance is made for the solvent, or 221 if the solvent is neglected, actual molecular weight of the non-volatile portion is 263.

The 4,5-dimethyl-o-phenylene diamine monohydrochloride starting material can be prepared by the addition of hydrochloric acid to the corresponding base dissolved in ethyl acetate, followed by precipitation of the salt with petroleum ether. This starting material has a M.P. 225° C. and has only slight solubility in the usual solvents.

*Example 5*

2-trichloromethyl-5,6-dimethylbenzimidazole was prepared as follows:

A solution of 5,6-dimethyl-o-phenylene diamine (0.04 mole) in dimethoxy ethane (50 ml.) was allowed to stand with methyl trichloroacetimidate (0.04 mole) overnight at 15–20° C. A precipitate present was removed by filtration. Addition of petroleum ether to the filtrate precipitated a little inorganic material, which also was removed by filtration. Evaporation of the filtrate gave crude 2-trichloromethyl-5,6-dimethylbenzimidazole in 35% yield.

*Example 6*

The procedure of Example 5 was substantially repeated using diethyl ether as the solvent. There was no evident reaction after one day, however, after one week, a precipitate had formed which was removed by filtration, and after evaporation of the filtrate, the residue was identified as the crude desired compound in 20% yield.

*Example 7*

5-methyl-2-trichloromethylbenzimidazole was prepared as follows:

Methyltrichloroacetimidate (0.15 mole) was added to a solution of 3,4-diaminotoluene hydrochloride (0.15 mole) in 1,2-dimethoxyethane (400 ml.) at room temperature, and left overnight. Ammonium chloride was then filtered and petroleum ether (B.P. 40–60° C.) was added to the filtrate to precipitate by-products. These were filtered off and the solution was evaporated to give 5-methyl-2-trichloromethylbenzimidazole in 60% yield. After recrystallization from benzene, the solid had M.P. 187° C.

Analysis for $C_9H_7N_2Cl_3$. Found: C, 42.9; H, 2.9; N, 11.0%. Calculated: C, 43.2; H, 2.8; N, 11.2%.

*Example 8*

2-trichloromethylbenzimidazole was prepared as follows:

Methyl trichloroacetimidate (5.98 mole) was added over 1 hour period at 25–30° C. to a slurry of o-phenylene diamine hydrochloride (6.05 mole) in anhydrous methanol (3.5 litre). The mixture was stirred at 25–30° C. for 2 hours then poured into water (7 litre). The solid was filtered, washed with water and dried, giving 1409 g. of 2-trichloromethylbenzimidazole (98% theoretical).

*Example 9*

2-trichloromethylbenzimidazole was prepared as follows:

A mixture of o-phenylene diamine (21.6 g.), concentrated hydrochloric acid (20 ml.) and n-butanol (70 ml.) was heated at a pressure of about 100 mm. Hg under a water separating head until no more water was entrained. The resultant dry slurry of o-phenylene diamine hydrochloride was stirred at about 10° C. while methyl trichloroacetimidate (35.3 g.) was added over a period of 2 hours within a temperature range of 10–20° C. The mixture was stirred for a further 2 hours then diluted with water (1 litre). The precipitated 2-trichloromethylbenzimidazole was filtered off, washed with water and dried, giving 43.2 g. (91.5% theoretical).

*Example 10*

2-trichloromethylbenzimidazole was prepared as follows: o-Phenylene diamine (2-mole) was stirred in dry methanol (1 litre) at 20–30° C. while concentrated sulphuric acid (1 mole) was added gradually. The resultant slurry was stirred at 10° C. while methyl trichloroacetimidate (2 mole) was added over 2 hours. After stirring for a further 2 hours at 10–20° C. the mixture was diluted with water (3 litre) and the 2-trichloromethylbenzimidazole was filtered, washed with water and dried, giving about 444 g. (94.5% theoretical).

Compounds in accordance with this invention are useful per se as anthelmintics and as intermediates for the preparation of a wide range of 2-substituted benzimidazoles having valuable technical applications. The trichloromethyl group in the compounds of the invention is apparently activated by the adjacent benzimidazole ring and the chlorine atoms in the present compounds are much more easily displaced by nucleophilic reagents than, for example, in benzotrichloride, hence replacement reactions to give other 2-substituted benzimidazoles as indicated, readily occur. Thus, ethylene diamine reacts with 2-trichloromethylbenzimidazole to form 2-(2'-iminazolin-2'yl) benzimidazole, which is highly useful in the treatment of helminthiasis, i.e., the treatment of animals suffering from an infestation of the gastro-intestinal tract with parasitic worms, since it gives 100% kill of *Haemonchus contortus* in sheep at a dose rate of 25 mg./kg.

The compounds of the invention are themselves useful in the treatment of helminthiasis, said compounds combining a useful activity in combatting the parasitic worms while having a low toxicity towards the host animals. Veterinary anthelmintic formulations can be either as an aqueous suspension ready to use, or, as a water-wettable or water-dispersible powder which is mixed with water prior to use. A typical liquid-suspension formulation may contain the active compound together with a dispersing agent, stabilizing agent, and other additives. A preferred formulation is as follows:

| | Parts wt. |
|---|---|
| Active compound | 50–55 |
| Dispersing agent | ½–2 |
| Stabilizing agent | 1–3 |
| Preservative, as required. | |
| Water, sufficient to make 100 volumes. | |

Various types of dispersing agents can be employed, but those containing sulphonate groups, for example, sodium lignin sulphonate or the sulphonated phenol or naphthol formaldehyde polymers, are preferred. Bentonite and protective colloids as carboxy methyl cellulose and sodium alginate, and the like, are illustrative of the various stabilizing agents that can be used. The formulations can be prepared by mixing the active compound and the water which already contains dissolved therein the dispersing agents and other components. A wettable or water-dispersible powder formulation may contain the active compound together with a wetting agent and dispersing agent. A diluent such as kaolin can also be added. An anti-foaming agent, and, in some cases, a stabilizing agent, may be present. A preferred formulation is as follows:

| | Parts wt. |
|---|---|
| Active compound | 90–95 |
| Wetting agent | ½–4 |
| Stabilizing agent | 0–2 |
| Anti-foaming agent | 0.01–1 |
| Water | 0–5 |

Non-ionic and anionic surfactants can be used in these formulations.

Suitable non-ionic wetting agents include the non-ionic alkylphenyl-ethylene oxide adducts, such as an octylphenol or nonylphenol condensed with ten moles of ethylene oxide and suitable anionic materials; for example, aryl alkyl sulphonates, such as sodium dodecyl benzene sulphonates, sodium dibutyl naphthalene sulphonate, and the like. In general, about 1% w./w. wetting agent is used. The anti-foaming agent employed may be a silicone, such materials as ethyl hexanol, octanol, and the like; and the stabilizing agent may again be chosen from bentonite, the water-soluble gums, and the like. Water-wettable or water-dispersible powder formulations are conveniently prepared by mixing the active compound with other in-

What is claimed is:

1. A compound of the formula:

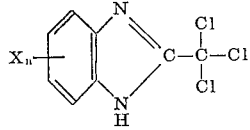

wherein X is selected from the group consisting of halogen, hydroxy, nitro, amino, acetoxy, acetylamino; alkyl, alkoxy, alkylthio and haloalkyl of not more than 8 carbon atoms; and amino substituted with alkyl groups of not more than 8 carbon atoms; and $n$ is an integer from 0 to 4.

2. A compound of the formula:

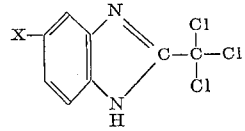

wherein X is selected from the group consisting of halogen, hydroxy, nitro, amino, acetoxy, acetylamino; alkyl, alkoxy, alkylthio and haloalkyl of not more than 8 carbon atoms; and amino substituted with alkyl groups of not more than 8 carbon atoms.

3. A compound of the formula:

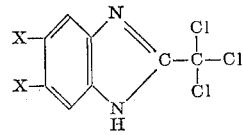

wherein X is selected from the group consisting of halogen, hydroxy, nitro, amino, acetoxy, acetylamino; alkyl, alkoxy, akylthio and haloalkyl of not more than 8 carbon atoms; and amino substituted with alkyl groups of not more than 8 carbon atoms.

4. A compound of the formula:

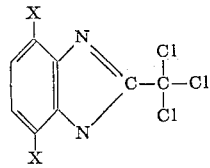

wherein X is selected from the group consisting of halogen, hydroxy, nitro, amino, acetoxy, acetylamino; alkyl, alkoxy, akylthio and haloalkyl of not more than 8 carbon atoms; and amino substituted with alkyl groups of not more than 8 carbon atoms.

5. 2-trichloromethylbenzimidazole.
6. 2-trichloromethyl-5-methylbenzimidazole.
7. 2-trichloromethyl-5,6-dimethylbenzimidazole.
8. 2-trichloromethyl-5-chlorobenzimidazole.
9. 2-trichloromethyl-5,6-dichlorobenzimidazole.
10. 2-trichloromethyl-5-nitrobenzimidazole.
11. 2-trichloromethyl-5-methoxybenzimidazole.

References Cited
UNITED STATES PATENTS 3,147,274  9/1964  Moyle et al. ------ 260—309.2

FOREIGN PATENTS 204,730  8/1939  Switzerland.

OTHER REFERENCES

Hofmann: Imidazole and its Derivatives Part I pp. 260–267 New York, Interscience, 1953.

Morgan: Jour. Chem. Soc. (London) 1961, pp. 2343–47.

Smith et al.: Jour. Amer. Chem. Soc. vol. 75, pp. 1292–94 (1953).

Wright: Chemical Reviews, vol. 48, pp. 397, 401, 404–8, and 442–44 (1951).

WALTER A. MODANCE, *Primary Examiner.*

NATALIE TROUSOF, *Examiner.*